(12) United States Patent
Fox et al.

(10) Patent No.: US 12,084,570 B2
(45) Date of Patent: Sep. 10, 2024

(54) CHITOSAN AS AN INTUMESCING, THERMOFORMABLE FLAME RETARDANT

(71) Applicant: AMERICAN UNIVERSITY, Washington, DC (US)

(72) Inventors: Douglas Fox, Reston, VA (US); Mauro Zammarano, Gaithersburg, MD (US); Whirang Cho, Gaithersburg, MD (US)

(73) Assignee: AMERICAN UNIVERSITY, Washington, DC (US)

( * ) Notice: Subject to any disclaimer, the term of this patent is extended or adjusted under 35 U.S.C. 154(b) by 552 days.

(21) Appl. No.: 17/016,855

(22) Filed: Sep. 10, 2020

(65) Prior Publication Data
US 2021/0095102 A1    Apr. 1, 2021

Related U.S. Application Data

(60) Provisional application No. 62/898,773, filed on Sep. 11, 2019.

(51) Int. Cl.
*C08L 5/08* (2006.01)
*C08B 37/08* (2006.01)
(Continued)

(52) U.S. Cl.
CPC .............. *C08L 5/08* (2013.01); *C08B 37/003* (2013.01); *C08K 2003/2224* (2013.01);
(Continued)

(58) Field of Classification Search
None
See application file for complete search history.

(56) References Cited

U.S. PATENT DOCUMENTS

2006/0142421 A1* 6/2006 Ihara ................... C09K 21/14
  523/205
2006/0217469 A1* 9/2006 Bauer ................ C08K 5/5313
  524/115

(Continued)

FOREIGN PATENT DOCUMENTS

CN    105056629 A   * 11/2015
JP    3324873 B2    * 9/2002
(Continued)

OTHER PUBLICATIONS

JP-3324873-B2, English translation (Year: 2002).*
(Continued)

*Primary Examiner* — Stefanie J Cohen
(74) *Attorney, Agent, or Firm* — Thompson Hine LLP

(57) ABSTRACT

A flame retardant composition comprising chitosan or a modified chitosan, as well as a method for preparing a flame retardant comprising chitosan or a modified chitosan, is provided. Also provided are methods for making a flame retardant article using the described flame retardant composition. In various embodiments, the flame retardant composition is prepared by dissolution of chitosan or a modified chitosan by an aqueous acid, followed by evaporation of the water. In various embodiments, the flame retardant composition can further include at least one additional component selected from the group consisting of a polyol, flame retardant, nitrogen containing compound, carbonate containing compound, crosslinking agent, and combinations thereof.

17 Claims, 3 Drawing Sheets

(51) Int. Cl.

| | |
|---|---|
| C08K 3/22 | (2006.01) |
| C08K 3/26 | (2006.01) |
| C08K 5/00 | (2006.01) |
| C08K 5/07 | (2006.01) |
| C08K 5/092 | (2006.01) |
| C08K 5/3492 | (2006.01) |
| C08K 5/42 | (2006.01) |
| C08K 5/5353 | (2006.01) |

(52) U.S. Cl.
CPC ............... C08K 2003/2227 (2013.01); C08K 2003/265 (2013.01); C08K 5/0025 (2013.01); C08K 5/07 (2013.01); C08K 5/092 (2013.01); C08K 5/34926 (2013.01); C08K 5/42 (2013.01); C08K 5/5353 (2013.01); C08L 2201/02 (2013.01)

(56) References Cited

U.S. PATENT DOCUMENTS

| | | | | |
|---|---|---|---|---|
| 2009/0149639 A2* | 6/2009 | Lehoux | ............... | C08B 37/0003 536/20 |
| 2013/0052116 A1* | 2/2013 | Barney | ................... | B32B 9/045 423/331 |
| 2014/0275291 A1* | 9/2014 | McGrath | ................. | C08L 89/06 514/777 |
| 2015/0080335 A1* | 3/2015 | Gladman | ................... | A61P 7/04 536/20 |
| 2016/0348279 A1* | 12/2016 | Ramappa | ............... | B82Y 30/00 |
| 2017/0232134 A1* | 8/2017 | Clare | ................. | A61L 24/0036 424/488 |

FOREIGN PATENT DOCUMENTS

| | | | | |
|---|---|---|---|---|
| KR | 2006115793 A | * | 11/2006 | |
| WO | WO-0180912 A1 | * | 11/2001 | ............. A61L 15/28 |
| WO | WO-2008154992 A1 | * | 12/2008 | ....... B32B 17/10311 |
| WO | WO-2017015585 A1 | * | 1/2017 | ............. A62D 1/005 |

OTHER PUBLICATIONS

CN-105056629-A, English translation (Year: 2015).*
KR-2006115793-A, English translation (Year: 2006).*
WO-2008154992-A1, English translation (Year: 2008).*
Iiu et al, layer by layer assembly of hypophosphorus acid modified chitosan based coating for flame retardant polyester-cotton blends, ind. eng. chem. res., 56, 9426-9436 (Year: 2017).*
Illy et al, Phosphorylation of bio-based compounds: the state of the art (Year: 2015).*
Anitha, A.; Sowmya, S.; Kumar, P. T. S.; Deepthi, S.; Chennazhi, K. P.; Ehrlich, H.; Tsurkan, M.; Jayakumar, R., Chitin and chitosan in selected biomedical applications. *Prog. Polym. Sci.* 2014, 39, 1644-1667.
Azuma, K.; Ifuku, S.; Osaki, T.; Okamoto, Y.; Minami, S., Preparation and Biomedical Applications of Chitin and Chitosan Nanofibers. *Journal of Biomedical Nanotechnology* 2014, 10, 2891-2920.
Carosio, F.; Alongi, J.; Malucelli, G., Layer by Layer ammonium polyphosphate- based coatings for flame retardancy of polyester-cotton blends. *Carbohydrate Polymers* 2012, 88, 1460-1469.
Charuchinda, S.; Srikulkit, K.; Mowattana, T., Co-application of Sodium Polyphosphate and Chitosan to Improve Flame Retardancy of Cotton Fabric. *Journal of Scientific Research, Chulalongkorn University* 2005, 30, 97-107.
Cheung, R.; Ng, T.; Wong, J.; Chan, W., Chitosan: An Update on Potential Biomedical and Pharmaceutical Applications. *Marine Drugs* 2015, 13, 5156.
Domard, A., A perspective on 30 years research on chitin and chitosan. *Carbohydrate Polymers* 2011, 84, 696-703.

El-Tahlawy, K., Chitosan phosphate: A new way for production of eco-friendly flame-retardant cotton textiles. *The Journal of The Textile Institute* 2008, 99, 185-191.
Jǎtariu, A. N.; Danu, M.; Peptu, C. A.; Ioanid, G.; Ibanescu, C.; Popa, M., Ionically and Covalently Cross-Linked Hydrogels Based on Gelatin and Chitosan. *Soft Materials* 2013, 11, 45-54.
Jayakumar, R.; Menon, D.; Manzoor, K.; Nair, S. V.; Tamura, H., Biomedical applications of chitin and chitosan based nanomaterials—A short review. *Carbohydrate Polymers* 2010, 82, 227-232.
Laufer, G.; Kirkland, C.; Cain, A. A.; Grunlan, J. C., Clay-Chitosan Nanobrick Walls: Completely Renewable Gas Barrier and Flame-Retardant Nanocoatings. *ACS Applied Materials & Interfaces* 2012, 4, 1643-1649.
Liu, Longxiang, et al., Layer-by-Layer Assembly of Hypophosphorous Acid-Modified Chitosan Based Coating for Flame-Retardant Polyester-cotton Blends. *American Chemical Society*, 2017, pp. 9429-9436, 8 pages.
Lodhi, G.; Kim, Y.-S.; Hwang, J.-W.; Kim, S.-K.; Jeon, Y.-J.; Je, J.-Y.; Ahn, C.-B.; Moon, S.-H.; Jeon, B.-T.; Park, P.-J., Chitooligosaccharide and Its Derivatives: Preparation and Biological Applications. *BioMed Research International* 2014, 2014, 13.
Mao, S.; Shuai, X.; Unger, F.; Simon, M.; Bi, D.; Kissel, T., The depolymerization of chitosan: effects on physicochemical and biological properties. *International Journal of Pharmaceutics* 2004, 281, 45-54.
Muzzarelli, R. A.; Stanic, V.; Ramos, V., Enzymatic Depolymerization of Chitins and Chitosans. *Methods in Biotechnology*, vol. 10, 1999, pp. 197-211.
Pillai, C. K. S.; Paul, W.; Sharma, C. P., Chitin and chitosan polymers: Chemistry, solubility and fiber formation. *Prog. Polym. Sci.* 2009, 34, 641-678.
Ramya, R.; Venkatesan, J.; Kim, S. K.; Sudha, P. N., Biomedical Applications of Chitosan: An Overview. *Journal of Biomaterials and Tissue Engineering* 2012, 2, 100-111.
Rinaudo, M., Chitin and chitosan: Properties and applications. *Prog. Polym. Sci.* 2006, 31, 603-632.
Rinaudo, M.; Pavlov, G.; Desbrières, J., Influence of acetic acid concentration on the solubilization of chitosan. *Polymer* 1999, 40, 7029-7032.
Romanazzi, G.; Gabler, F. M.; Margosan, D.; Mackey, B. E.; Smilanick, J. L., Effect of Chitosan Dissolved in Different Acids on Its Ability to Control Postharvest Gray Mold of Table Grape. *Phytopathology* 2009, 99, 1028-1036.
Srikulkit, K.; Iamsamai, C.; Dubas, S. T., Development of Flame Retardant Polyphosphoric Acid Coating Based on the Polyelectrolyte Multilayers Technique. *Journal of Metals, Materials and Minerals* 2006, 16, 41-45.
Thakhiew, W.; Devahastin, S.; Soponronnarit, S., Effects of drying methods and plasticizer concentration on some physical and mechanical properties of edible chitosan films. *Journal of Food Engineering* 2010, 99, 216-224.
Tian, F.; Liu, Y.; Hu, K.; Zhao, B., Study of the depolymerization behavior of chitosan by hydrogen peroxide. *Carbohydrate Polymers* 2004, 57, 31-37.
Van den Broek, L. A. M.; Knoop, R. J. I.; Kappen, F. H. J.; Boeriu, C. G., Chitosan films and blends for packaging material. *Carbohydrate Polymers* 2015, 116, 237-242.
Xing, R.; Liu, S.; Yu, H.; Guo, Z.; Wang, P.; Li, C.; Li, Z.; Li, P., Salt-assisted acid hydrolysis of chitosan to oligomers under microwave irradiation. *Carbohydrate Research* 2005, 340, 2150-2153.
Zhang, T.; Yan, H.; Shen, L.; Fang, Z.; Zhang, X.; Wang, J.; Zhang, B., Chitosan/Phytic Acid Polyelectrolyte Complex: A Green and Renewable Intumescent Flame Retardant System for Ethylene-Vinyl Acetate Copolymer. *Ind. Eng. Chem. Res.* 2014, 53, 19199-19207.
Zhao, Q.; Cheng, X.; Ji, Q.; Kang, C.; Chen, X., Effect of organic and inorganic acids on chitosan/glycerophosphate thermosensitive hydrogel. *J Sol-Gel Sci Technol* 2009, 50, 111-118.

* cited by examiner

FIGS. 3A-D
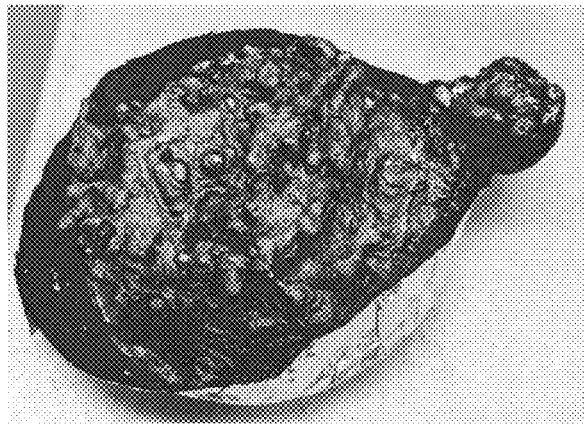
A
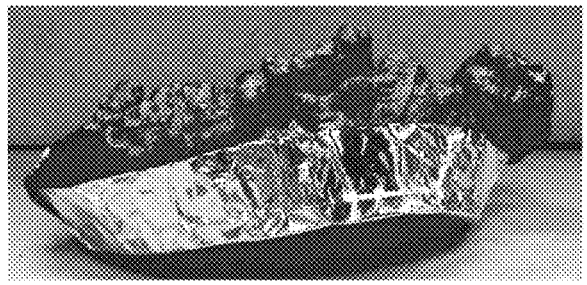
B
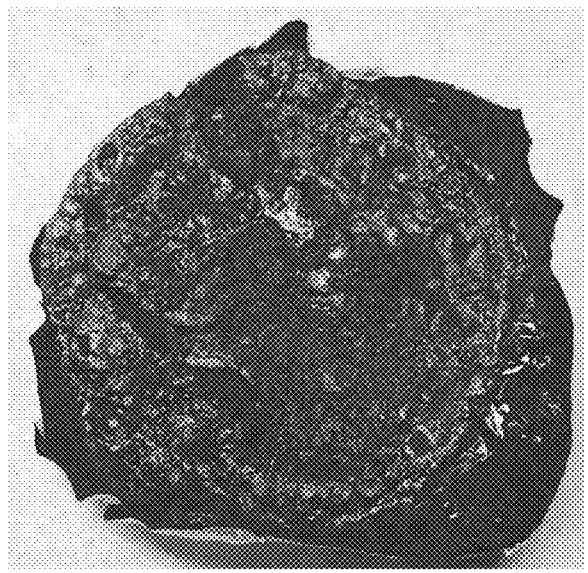
C
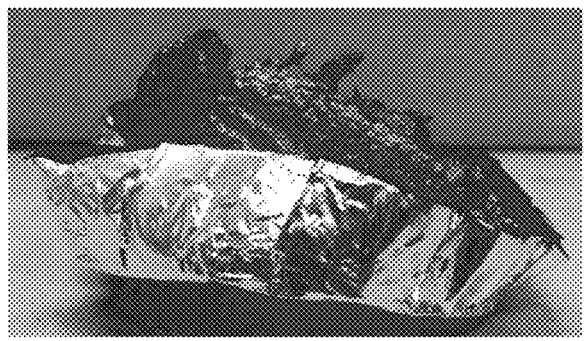
D

CHITOSAN AS AN INTUMESCING, THERMOFORMABLE FLAME RETARDANT

ACKNOWLEDGEMENT OF GOVERNMENT SUPPORT

This invention was made with Government support under Grant No. 70NANB17H229, awarded by the National Institute for Standards and Technology. The government has certain rights in the invention.

FIELD OF THE INVENTION

Provided is a flame retardant composition comprising chitosan, a modified chitosan, or a combination thereof; an aqueous acid; and a polyol and/or crosslinking agent. Further provided is a method for preparing a flame retardant composition, as well as a flame retardant article and a method for preparing a flame retardant article.

BACKGROUND

Chitin is the second most abundant polymer found in nature, behind only cellulose. It is primarily found in the exoskeletons of arthropods, such as crabs or insects, and is often mineralized with calcium carbonate. Chitin is composed of $\beta(1,4)$-linked 2-acetamido-2-deoxy-$\beta$-D-glucose (N-acetylglucosamine), which is hard, inelastic, and chemically resistant. The poor solubility in almost all solvents makes chitin very difficult to process and limiting its applications to scaffolding materials or fillers for polymers. Treatment with strongly alkaline solutions partially deacetylates chitin, forming glucosamine units along the polysaccharide chain. When the deacetylation is greater than 50%, it forms the compound known as chitosan, which is water soluble in acidic solutions. This aqueous solubility leads to many applications for chitosan as solutions, gels, films, or fibers (1, 2).

Chitosan forms a polyvalent cation in acidic solutions when the amines along the polysaccharide chains are protonated. As with all polyelectrolytes, chitosan can be physically crosslinked to form insoluble gels by introducing polyvalent cations. Control of the gelation procedure is difficult, typically resulting in gels that form immediately upon mixing (diffusion controlled gelation) (3). The use of monoammonium phosphate (MAP) has been shown to inhibit the gelation process and allow for more control over when polyvalent cations precipitate the chitosan.

Chitosan can be dissolved in a variety of aqueous acids (4, 5). The $pK_a$ of chitosan is between 6.2 and 6.5. Any acid that can produce a pH below this range is capable of dissolving chitosan. However, if the $2^{nd}$ proton of a polyprotic acid is significantly labile, a divalent anion forms. This anion will then bond between two amine groups on the chitosan chains. The physical crosslinking will result in the formation of an insoluble chitosan salt. For example, the use of sulfuric acid results in the formation of chitosan sulfate, preventing the formation of a soluble chitosan solution. Other polyprotic acids, such as phosphoric acid or citric acid, have only one significantly labile proton. The absence of any significant amount of polyvalent cations in these solutions allow stable chitosan solutions to form.

Thermosets are polymers that once formed cannot be re-melted, molded, or formed into new configurations. They are typically formed when one of the monomers has two reactive sites, resulting in a crosslinked structure. This crosslinked polymer is essentially one large molecule, making it impossible to fully solvate. As a result, thermosets are also insoluble in solvents once they are formed or cured. Chitin is essentially a thermoset. The linear chains form extensive hydrogen bonded networks that make them insoluble in nearly all solvents (2, 6). Upon heating, chitin decomposes prior to melting. Chitosan is similar, except that the hydrogen bonds can be disrupted by water in solution when the amines are protonated. Despite the greater ease in solubilizing chitosan, it still forms an extended hydrogen bonded network in the solid phase, resulting in the inability to melt or mold the solid. So all processing must be conducted in the solution phase. In the described process, a solid chitosan blend is prepared that is moldable under moderate pressures at slightly elevated temperatures.

Chitosan has been used to prepare films and coatings for a variety of applications, including wound healing, tissue engineering, food preservation, and flame retardancy (7-9). One of the greatest challenges in these applications is the brittleness of the final product (10). Plasticizers are typically added to improve the elongation of the film or coating. While many plasticizers have been investigated, the most effective ones are small, hydrophilic molecules, such as glycerol or sorbitol. In most formulations, the amount of plasticizer added is only as much as is needed to prevent cracking when it is deformed. In the described process, the amount of plasticizer added is maximized to improve the flow and reduce the cost of the coating.

Currently, chitosan has the most applications in the biomedical field. The key biomedical properties of chitosan include its inherent antimicrobial behavior, biocompatibility, and biodegradability. It has been used extensively in wound dressings, tissue engineering, and drug delivery (7, 11-14). However, it suffers from low solubility, particularly at physiological pH (4, 14, 15).

Recently, it has been found that the solubility at moderate pHs is vastly increased by reducing the molecular weight of the chitosan (16). There has been much research into forming oligochitosan (OC), which exhibits both higher solubility and enhanced antimicrobial behavior. OC can be formed using chemical methods, enzymatic methods, or thermal methods. Chemical methods include acid hydrolysis, typically using HCl at low pH and high temperatures or in the presence of salt under microwave irradiation (16, 17) and oxidation, using nitrite salts (18) or hydrogen peroxide (19). The presence of side products and salts and the lack of molecular weight control detract from these simple methods. Chitosan can be depolymerized using enzymes (16, 20). Enzymatic degradation produces OC with more narrow molecular weight distributions, which is better for tailoring properties and identifying ideal molecule sizes.

Chitosan has also been used in other, non-medical applications, such as the use as a flame retardant additive (9, 21-24). The value of chitosan as a flame retardant had been realized over a decade ago, with the layer by layer assembly of chitosan and sodium polyphosphate on cotton (25). In almost all cases, a phosphorus component is needed to improve the efficacy of chitosan as a flame retardant. The phosphorus can be grafted directly onto the chitosan polymer chain or added as a component in layer by layer assembly of a coating. Because chitosan is dissolved in water as a polyelectrolyte, it is used mostly as a component in layer by layer assemblies. This coating method has several processing challenges yet to be resolved, including a need to pretreat the substrate surface, multiple processing and drying steps, and some water solubility despite ionic attraction to alternate layers. The phosphorus grafting methods reported in the literature use a pad-bake process with multiple salts or nonaqueous processes that include water-sensitive reagents. In the described process, chitosan is phosphorylated directly in aqueous solutions using the reducing acid, hypophosphorous acid, which was found to greatly reduce the processing steps and expense of the process.

SUMMARY

In one aspect, a flame retardant composition comprising chitosan, a modified chitosan, or a combination thereof; an aqueous acid; and a polyol and/or crosslinking agent is provided. In various embodiments, the flame retardant composition is a coating which is applied to a substrate to impart flame retardant properties. In various embodiments, the flame retardant composition further comprises at least one additional component selected from the group consisting of an inorganic mineral, an amine-containing compound, a carbonate containing compound, and combinations thereof. In various embodiments, the coating composition is an intumescent composition.

In another aspect, a method for preparing a flame retardant composition is provided, where the method comprises dissolving chitosan or a modified chitosan with an aqueous acid(s) over a period of up to 30 days, and evaporating the water to produce a dried flame retardant composition.

In yet another aspect, a flame retardant article and a method for preparing a flame retardant article is provided. In one embodiment, the method comprises applying the described flame retardant composition to a substrate, such as wood, paper, cardboard, plastic, fabric, or a composite comprising wood, paper, cardboard, plastic, and/or fabric, followed by evaporation of the water. In one embodiment, a crosslinking agent is added as a separate solution after the composition has dried after evaporation of the water.

BRIEF DESCRIPTION OF THE DRAWINGS

FIGS. 3A-D show char residue for Chitosan—$H_3PO_2$—sorbitol (A, B) and Chitosan—$H_3PO_2$—sorbitol—clay (C, D) after combustion in the cone calorimeter (50 kW external flux).

DETAILED DESCRIPTION

The following detailed description will illustrate the general principles of the invention, embodiments of which are additionally provided in the accompanying examples.

In one aspect, a flame retardant comprising chitosan, a modified chitosan, or combination thereof; an aqueous acid; and a polyol and/or crosslinking agent is provided. In various embodiments, the chitosan is substantially water insoluble. The composition, which can be sued as a coating, can further comprise at least one additional component selected from the group consisting of an inorganic mineral, an amine-containing compound, a carbonate containing compound, and combinations thereof. In various embodiments, the composition is an intumescent composition.

In accordance with a particular aspect, an article comprising a substrate and the described coating composition is provided, where the substrate comprises paper, wood, synthetic polymer, natural fiber, or other flammable and/or combustible material.

In accordance with another aspect, a method for making the chitosan flame retardant thermoformable and extrudable is provided.

Other aspects include methods for increasing flame retardant properties of a substrate, reducing the water solubility of the flame retardant, the method comprising either forming the coating composition and applying the coating composition to a substrate, and rendering the coating water insoluble or forming the thermoformable, filler composition and melt mixing it with a polymer.

Chitosan Dissolution & Degradation

Figure 1:
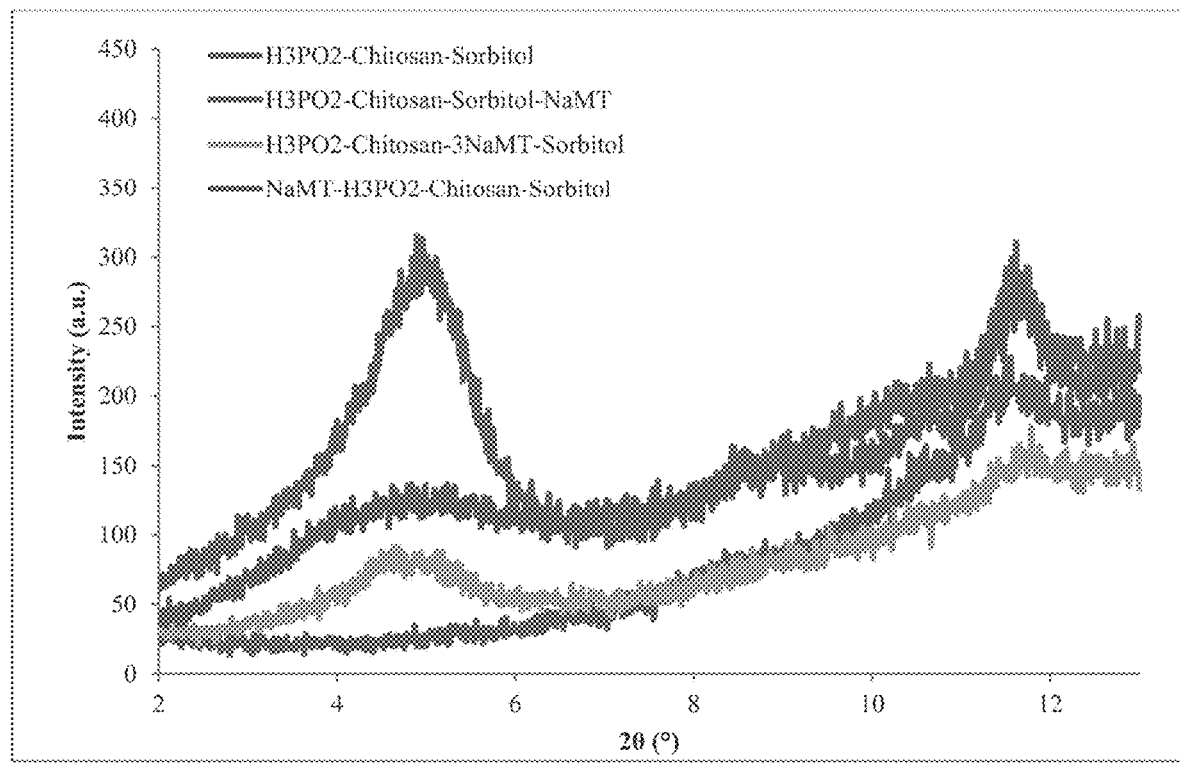
FIG. 1 shows powder x-ray diffraction of dried chitosan/$H_3PO_2$/sorbitol/NaMT films according to various embodiments.

Chitosan will dissolve in a variety of aqueous acid solutions. Chitosan (1 g) was dissolved in hypophosphorous acid with a concentration equal to the concentration of chitosan amines in solution (0.33 g $H_3PO_2$ in 50 mL of water) by mechanical stirring. Hypophosphorous acid concentrations were varied between 0.75 and 2 times the number of glucosamine units in the chitosan to assess the effects on solubility and flammability. Acetic acid, citric acid, hydrochloric acid, and phosphoric acid were also used for control experiments. Sorbitol was added in equal mass to chitosan (1 g). After dissolution, the solution was sonicated for 1-2 h to degas the solution and help deflocculate any clay prior to casting into silicone molds. The water was removed by evaporation in air, under a vacuum at room temperature, or in a low temperature oven (40° C.). Clay, such as sodium montmorillonite, laponite, hectorite, or layered double hydroxides, was added in some formulations as either a dry powder or a 3% solution (by mass). The addition of dry powder resulted in films with aggregated clay particles. The level of clay intercalation changed depending on the order of addition to the solution and the sonication time. As shown in the powder x-ray diffraction data (FIG. 1), the highest levels of chitosan intercalated clay were achieved by adding the clay solution last with 1-2 h sonication. Depending on the order of addition, either protons or chitosan intercalates into the clay galleries. The d-spacings of montmorillonite intercalated with protons, sodium, and chitosan are 1.05 nm, 1.23 nm, and 1.84 nm, respectively.

Some of the prepared films were further processed by soaking in a neutralizing solution. The composites were soaked for various times (2 min-2 wks) in 1 M buffer solutions with a pH greater than or equal to 6. Films were then washed or soaked in pure water to remove salts. Ammonia and phosphate buffers were utilized to ensure any residual salts could act as a flame retardant. Neutralization sometimes reduced intumescence when a butane flame is applied to the coating.

Figure 2:
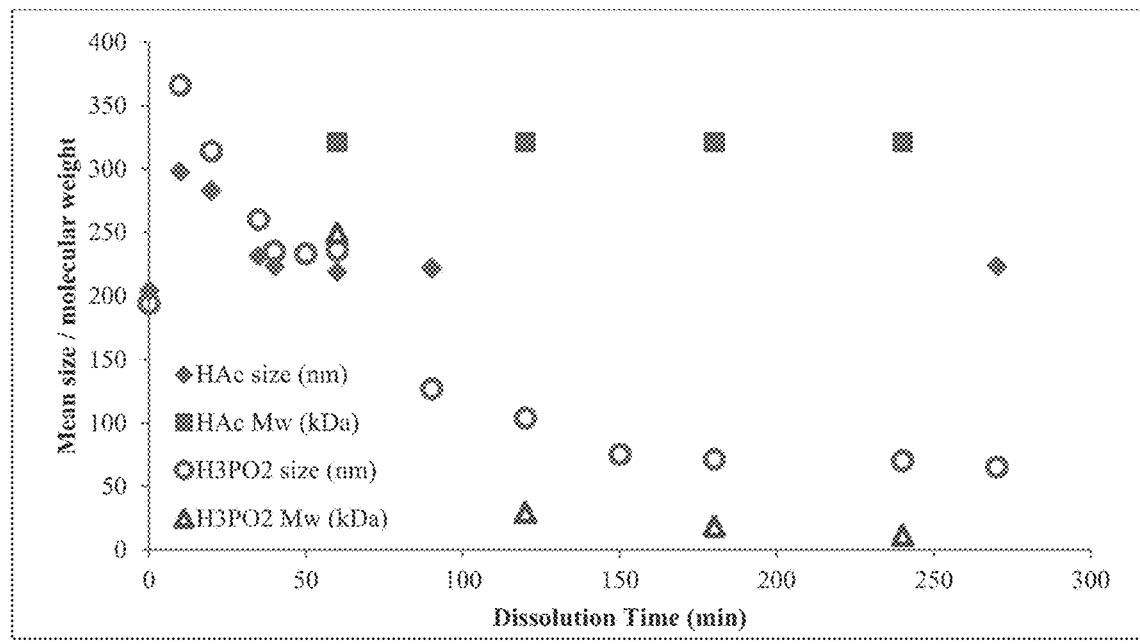
FIG. 2 shows molecular weight and particle size over time, according to various embodiments, by GPC and SLS.

Acetic acid, hydrochloric acid, phosphonoacetic acid, and citric acid have also been used to prepare films. The use of hypophosphorous acid has several advantages over the other acids. Rheological, static light scattering (SLS), and gel permeation chromatography (GPC) experiments have shown that $H_3PO_2$ depolymerizes the chitosan, resulting in solutions that can be processed more easily. In addition, this may inhibit the physical gelation by polyvalent cations. The molecular weight decrease over dissolution time is shown in FIG. 2. Use of acetic acid results in cellulose chains with a number average molecular weight of 325 kDa and mean particle sizes of 225 nm. Hypophosphorus depolymerizes the chitosan chains, and plateaus around a number average molecular weight of 11 kDa with a mean particle size of 70 nm. Hypophosphorous acid also adds phosphorus covalently to the chitosan chains using a 1-step aqueous process. This should improve the flame retardant efficacy and durability of the coating. And, hypophosphorous acid decomposes upon heating, producing some products that are strong reducing agents. These reducing agents can crosslink the chitosan to a form a less soluble state. NMR and rheological experiments are currently under investigation to help elucidate the mechanism.

Chitosan Antimicrobial Behavior

The depolymerization of chitosan by hypophosphorous acid at room temperature provides a simpler route to forming oligochitosan (OC) than other chemical methods. In addition, the GPC results indicate that the molecular weight distribution narrows upon dissolution with this acid, which is different than what has been found when using other chemical depolymerization methods. The solubility and antimicrobial behavior of the OC was examined by first neutralizing the chitosan solution, dialyzing against pure water with a low molecular weight cut-off membrane, and evaporating the dialyzed solution to dryness. The solubility of the dried product was examined over a pH range and compared to commercially obtained chitosan of varying molecular weight. The antimicrobial properties were examined using a standard protocol by dissolving in acetic acid. The OC still had antimicrobial activity, but the antimicrobial activity against *E. coli* was reduced.

Chitosan Film Flexibility

Chitosan typically forms hard, brittle films after casting. The flexibility of the films can be improved by the addition of plasticizers. We found the greatest improvement using small hydrophilic molecules, such as sorbitol, glycerol, or low-molecular weight polyethylene glycol as the plasticizer. By increasing the plasticizer content above 33%, the chitosan films undergo a glass transition and have the ability to flow under heat and moderate pressure. Films produced with equal masses of chitosan and sorbitol can be hot pressed and compression molded at 60° C. and 1000 psi, regardless of the acid used to dissolve the chitosan. Films prepared from plasticizers with lower melting points can be compression molded at lower temperatures. The presence of clay also lowers the molding temperature; chitosan—sorbitol films with 3 mass-% sodium montmorillonite can be compression molded at room temperature (18° C.). Using these higher levels of plasticizer increases the number of applications for the chitosan films, by enabling extrusion, injection molding, and compression molding processes. Previously, the only reported methods for producing extrudable chitosan without the presence of water was blending the chitosan with polymers, such as poly-□-caprolactone, poly(butylene succinate), or poly(lactic acid).

Chitosan Crosslinking

The solubility of chitosan before and after heating was monitored by viscosity measurements. Raising the temperature above 100° C. produced films that visibly produced more viscous solutions when they were re-suspended in water. It is suspected that the reducing power of the acid crosslinks the chitosan at elevated temperatures once water is driven out of the composite. The effects of both temperature and time on the crosslinking were assessed using solubility and viscosity measurements. Chitosan composites (44-46 mg) were hot pressed at 70° C. into 4.67 mm diameter×1.67 mm thick samples. The samples were heated for various times at various temperatures, then placed in a solvent (15 mL). The time for dissolution, phosphorus content, and the viscosity of the subsequent solutions were measured. Placing the chitosan composite in an aqueous basic solution will dissolve the sorbitol and solubilize the counteranion as a neutral salt, leaving pure chitosan as a solid. The lower phosphorous contents in the neutralized solutions indicates that some of the hypophosphorous acid covalently attached to the chitosan. This was confirmed by changes observed in the $^{31}$P NMR spectra and by ICP measurements. Placing the chitosan composite in a basic ethanol solution prevented the dissolution of sorbitol. Imidazolium salts are soluble in ethanol and can be used to quantify the amount of counteranion remaining while ammonium salts are insoluble and neutralize the chitosan composite without removing any of the components. It was observed that films cast in aluminum dishes produced films that were visibly darker. It is likely that the aluminum catalyzes the crosslinking reaction.

Flame Retardancy of Chitosan Films

The flammability reduction potential of the chitosan containing flame retardant was tested by producing chitosan films by solvent casting the mixtures. For effective flame retardancy, the acid must be chosen to promote charring, intumescence, or gas phase action. It was found that hypophosphorous acid was the most effective at imbuing flame resistance to the composite or coating. This particular acid releases gases that include low oxidation state phosphorus, resulting in charring, intumescence, and strong gas phase inhibition of flames. Other acids capable of promoting flame resistance are acids containing phosphorus or sulfur. These include aminomethylphosphonic acid (AMPA), aminoethylsulfonic acid (taurine), phosphonoacetic acid (PAc), phenylphosphonic acid ($PhPO_3$) phenylphosphinic acid ($PhPO_2$), p-toluenesulfonic acid (TsOH), and trifluoromethylsulfonic acid (triflic acid), sulfaninilic acid (SAn).

Films were subjected to a variety of flammability tests. Applying a butane torch to the film revealed intumescence behavior for chitosan—$H_3PO_2$—plasticizer compositions. Use of acetic acid, hydrochloric acid or citric acid to dissolve the chitosan did not produce intumescent films. Additives with potential composite property enhancement were added to test their effects on flammability. Clay improves strength, stiffness, and viscosity; citric acid can crosslink carbohydrates to reduce water solubility; and sucralose can add gas phase flame resistance. Addition of any of these reduced or eliminated intumescent behavior when a torch flame was applied to the coating. Increasing the hypophosphorous acid content reduced the level of intumescence, but did not eliminate it.

The flammability of the film was tested using microcombustion calorimetry (MCC). The results (Table I) show that that the hypophosphorous acid increases the heat release over other acids. This is likely an artifact of oxygen, due to the release of reducing phosphorus species in the pyrolyzing gas, rather than more combustible materials being released. So, it is not surprising that higher acid concentrations lead to higher value for total heat release (THR) and heat release capacity (HRC). The addition of the plasticizer increases the char yield, illustrating the charring ability of the acid. Since the plasticizers are all hydrocarbons, there was an increase in the total heat released. The rise in HRC accompanying the added fuel was modest. Sorbitol and hydroxyethylcellulose exhibited the best characteristics. The addition of citric acid increases fuel, leading to slightly higher char yields and heat released. The temperature of peak heat release also rises slightly, likely due to a better char. Sucralose increases char and significantly reduces the heat released. It does eliminate intumescence, so it is most beneficial in systems that do not intumesce. Clay formed an effective thermal barrier, reducing heat released by nearly 50% with only a 3% loading. The barrier increased the temperature of peak heat release.

TABLE I

Microcombustion Calorimeter of Chitosan Based Films (no substrate)*

| Acid | Plasticizer | Additive | Char (mass %) | THR (kJ/g) | HRC (J/g·K) | $T_{peak1}$ (°C.) |
|---|---|---|---|---|---|---|
| 0 | 0 | 0 | 30.8 | 6.0 | 93 | 325 |
| 15.5 H3PO2 | 0 | 0 | 31.9 | 3.0 | 322 | 212 |
| 31.1 H3PO2 | 0 | 0 | 20.0 | 4.5 | 423 | 196 |
| 50.0 H3PO2 | 0 | 0 | 13.8 | 4.6 | 444 | 181 |
| 28.3 HAc | 0 | 0 |  | 3.9 | 35 | 198 |
| 17.2 HCl | 0 | 0 | 30.0 | 1.5 | 19 | 229 |
| 31.1 H3PO2 | 100 Sorbitol | 0 | 23.5 | 4.5 | 70 | 257 |
| 31.1 H3PO2 | 100 Glycerol | 0 | 22.9 | 6.7 | 127 | 231 |
| 31.1 H3PO2 | 100 HEC | 0 | 29.5 | 4.6 | 69 | 229 |
| 31.1 H3PO2 | 100 HPC | 0 | 22.4 | 8.5 | 266 | 209 |
| 50 H3PO2 | 100 Sorbitol | 3.9 H3Ct | 19.7 | 5.2 | 73 | 219 |
| 50 H3PO2 | 100 Sorbitol | 6.9 H3Ct | 20.9 | 5.6 | 80 | 224 |
| 31.1 H3PO2 | 100 Sorbitol | 50 Sucralose | 24.8 | 3.4 | 48 | 198 |
| 31.1 H3PO2 | 100 Sorbitol | 2.4 NaMT | 23.1 | 5.5 | 109 | 231 |
| 31.1 H3PO2 | 100 Sorbitol | 7.1 NaMT | 25.4 | 4.8 | 59 | 236 |

*All coatings contain chitosan. The listed values for acid, plasticizer, and additive are given in phc (parts per hundred chitosan by mass).

Films were molded into 3 mm thick, 75 mm diameter pucks and burned in a cone calorimeter. The pucks were prepared by hot pressing dried films (22 g) at 90° C. and 3000 psi for 30 min. Chitosan—$H_3PO_2$—sorbitol samples did not ignite under either a 35 kW or 50 kW heating flux. Samples with 3% montmorillonite ignited under a 50 kW heating flux after 78 s, generating 28% char, a peak heat release rate of 209 kW/m², a total heat release rate of 29.7 MJ/m², and an effective heat of combustion of 7.7 MJ/kg. It is likely that the clay slowed the rate of gas release, reducing the gas phase mechanism of the composite. The char residues (See FIG. 3) show the intumescence exhibited by these coatings.

Chitosan Co-Extrusion

The plasticized chitosan was used as a flame retardant additive in thermoplastics. The processing of chitosan hypophosphite ($ChPO_2$) must be kept at lower temperatures to prevent oxidative cross-linking, so only low melting thermoplastics were examined. The flame retardant properties of poly(vinyl acetate), PVAc; poly(ethylene-co-vinyl acetate), EVA; and poly(ethylene-co-methacrylic acid), PEMA, were examined with the addition of plasticized chitosan. Plasticized (p-$ChPO_2$) was better dispersed and had better flammability reduction than using just $ChPO_2$. PEMA composites containing 25% p-$ChPO_2$ reduced the peak heat release rate (PHRR) measured using a cone calorimeter from 1800 kW/m² to 700 kW/m². Replacing 10% of the p-$ChPO_2$ with magnesium hydroxide further reduced the PHRR to 620 kW/m² and produced a more stable intumescent char layer. The p-$ChPO_2$ containing composite self-extinguished in the horizontal UL-94 burn tests.

Plasticized chitosan films were also ground and co-extruded with polyvinyl acetate. A composite containing 15% (w:w) did not ignite using UL-94 tests in the vertical configuration (V-0 rating).

Flame Retardancy of Chitosan Coatings

The flame retardant mixture was applied as a coating on flexible polyurethane foams and wooden substrates. The flammability reduction of the foams was assessed using MCC and cone calorimetry. The MCC results are shown in Table II. Significant reductions in both the peak heat released (HRC, 45% reduction) and in the total heat released (THR, 20-28% reduction) were observed. Surprisingly, the use of clay did not appear to improve the flammability, though that may be due to the small sample size (5 mg) used in the technique. An increase in the degradation onset temperature is typical for intumescing flame retardants. Cone calorimetry reveals that the chitosan—$H_3PO_2$—sorbitol coating is ineffective at protecting the underlying foam, reducing the PHRR by only 11% and the THR by 23%. The coated sample released more smoke, which is typical for phosphorus based flame retardants. The addition of clay significantly improved the results. Using a coating with 1% by mass NaMT resulted in a 31% reduction in PHRR and a 29% reduction in the THR. The smoke release was similar to the other coated foams. The lack of correlation between MCC and cone results sometimes occurs with gas phase or intumescing flame retardants, both of which are present in these coating formulations. Increasing the clay content will likely improve the flame retardancy of the coating.

TABLE II

Microcombustion calorimetry results of coated foam samples.

| Ch:P:S:C* | Char (mass %) | THR (kJ/g) | HRC (J/g·K) | $T_{peak1}$ (°C.) | $T_{peak2}$ (°C.) |
|---|---|---|---|---|---|
| no coating | 0.1 | 25.1 | 513 | 290 | 402 |
| 1:0.33:1:0 | 10.1 | 20.1 | 306 | 316 | 399 |
| 1:0.33:1:0.024 | 10.5 | 20.1 | 288 | 313 | 377 |
| 1:0.67:1:0 | 12.1 | 17.7 | 274 | 311 | 372 |
| 1:0.67:1:0.027 | 12.5 | 18.8 | 293 | 315 | 392 |

*Chitosan:$H_3PO_2$:Sorbitol:NaMT mass ratio of the coating used.
Clay, when added, was maintained at 1% mass of the total coating.

Coatings were crosslinked to reduce their water solubility. Their flammability potential were characterized by char yield (TGA) and intumescence (visual appearance). $ChPO_2$ produced a char yield of 45-50% by mass at 800° C. under both nitrogen and air. Addition of polyethyleneimine, poly(diallyldimethylammonium chloride), or polybutadiene rubber latex (as a non-bonding water insoluble binder) increased the char yield and did not prevent dissolution of $ChPO_2$ when soaked in water. The addition of laponite increased the char yield, but did not affect the solubility. Crosslinking the chitosan produced films with very low solubility in both water and simulated seawater. Crosslinking with $Na_3PO_4$ eliminated the intumescence while losing about 10% of the char. Crosslinking with phytic acid did not alter the char yield, but eliminated most of the intumescence behavior. The intumescence behavior was maintained when crosslinking with nitrilotri(methylphosphonic acid), and the char yield was reduced by only 5%. Chemical crosslinking with dialdehydes produced insoluble, but swellable films that intumescenced when burned. The peak heat release rate measured by MCC never reached 30 W/g, which shows non-combustibility of these coatings. The MCC data is shown in Table III.

TABLE III

MCC data of crosslinked chitosan coatings.

| | 6% Ch-H2PO2 with Lap | X-linked Phytic acid (10%) | X-linked Nitrilo acid (10%) | X-linked Glyoxal (0.8%) |
|---|---|---|---|---|
| THR (kJ/g) | 4.95 | 1.78 | 2.88 | 3.28 |
| Char yield (%) | 41.4 | 48.6 | 44.8 | 53.3 |

Figure 4:
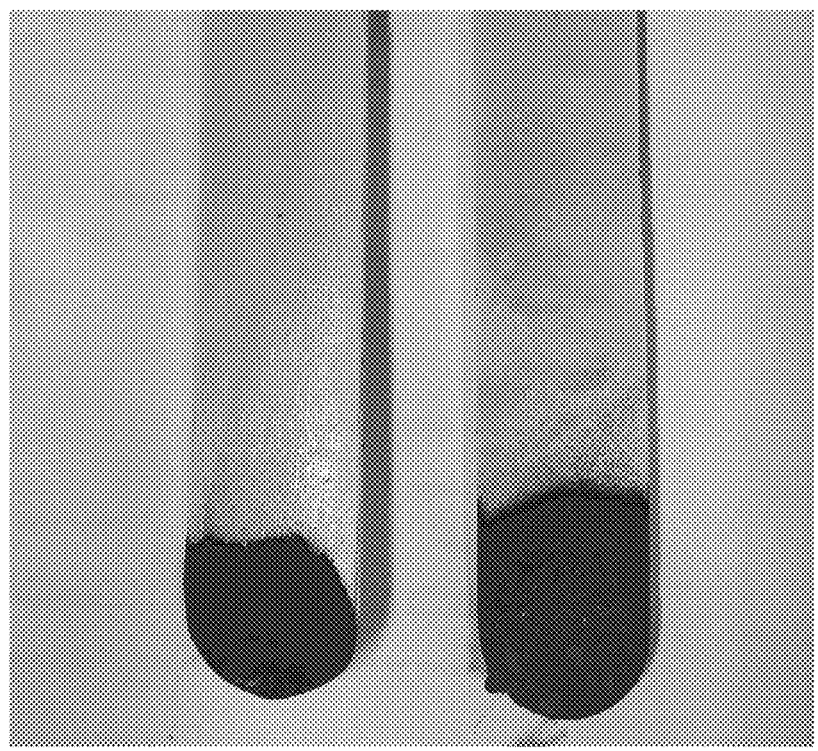
FIG. 4 shows residue for wooden substrate coated with Chitosan—$H_3PO_2$ and crosslinked with phytic acid (left) and wooden substrate coated with Chitosan—$H_3PO_2$ and crosslinked with nitrilotri(methylphosphonic acid) (right) after combustion in the vertical UL-94 configuration.

The coatings were applied to wooden stick substrates and burned in a vertical UL-94 configuration. Uncoated sticks were consumed by flames, producing char. Afterglow was present on the char, completely consuming it over a period of a few seconds, producing only grey ash. The $ChPO_2$ coated sticks did not ignite upon flame impingement, produced an intumescent char at the impingement site, and exhibited no afterglow. Coated sticks crosslinked with phytic acid or nitrilotri(methylphosphonic acid) self-extinguished soon after removing flame impingement, and the latter exhibited intumescence at the impingement site (See FIG. 4). Coated sticks crosslinked with glutaraldehyde burned the entire length along the edges, but did prevent the complete combustion of the sticks.

Coating Swelling

As a hydrophilic polymer, chitosan absorbs water quite readily. Crosslinked films typically swell considerably. Although the films remain insoluble in water, the extensive swelling can lead to poor mechanical properties and loss of efficacy in high moisture environments. To reduce the swelling, a number of approaches have been employed. Prior to dissolution, chitin is modified with an alkyl halide (such as bromobutane) and de-acetylated in base to form a modified chitosan. The modified chitosan is mostly soluble in hypophosphorous acid and renders the surface more hydrophobic. Additionally, the crosslink density of the formed film can be increased. This is accomplished by the addition of a higher concentration of crosslinking agent. The crosslinking agent typically uses covalent attachments and can include dialdehydes, diglycidyl compounds, and vinyl monomers. Crosslinking with vinyl compounds is particularly attractive, because photoinitiators can be added to allow for UV curing after applying the coatings to an outdoor structure. The vinyl monomers can be grafted to the chitosan surface using nucleophilic addition with compounds such as 4-vinylbenzene chloride or 2-chloroethyl chloroethyl acrylate. The crosslinking can be initiated using heat with a thermal initiator or UV irradiation with a photoinitiator.

Each of the following references is incorporated herein by reference in its entirety.

1. Domard, A., A perspective on 30 years research on chitin and chitosan. *Carbohydrate Polymers* 2011, 84, 696-703.
2. Rinaudo, M., Chitin and chitosan: Properties and applications. *Prog. Polym. Sci.* 2006, 31, 603-632.
3. Jătariu, A. N.; Danu, M.; Peptu, C. A.; Ioanid, G.; Ibanescu, C.; Popa, M., Ionically and Covalently Cross-Linked Hydrogels Based on Gelatin and Chitosan. *Soft Materials* 2013, 11, 45-54.
4. Romanazzi, G.; Gabler, F. M.; Margosan, D.; Mackey, B. E.; Smilanick, J. L., Effect of Chitosan Dissolved in Different Acids on Its Ability to Control Postharvest Gray Mold of Table Grape. *Phytopathology* 2009, 99, 1028-1036.
5. Zhao, Q.; Cheng, X.; Ji, Q.; Kang, C.; Chen, X., Effect of organic and inorganic acids on chitosan/glycerophosphate thermosensitive hydrogel. *J Sol-Gel Sci Technol* 2009, 50, 111-118.
6. Pillai, C. K. S.; Paul, W.; Sharma, C. P., Chitin and chitosan polymers: Chemistry, solubility and fiber formation. *Prog. Polym. Sci.* 2009, 34, 641-678.
7. Jayakumar, R.; Menon, D.; Manzoor, K.; Nair, S. V.; Tamura, H., Biomedical applications of chitin and chitosan based nanomaterials—A short review. *Carbohydrate Polymers* 2010, 82, 227-232.
8. van den Broek, L. A. M.; Knoop, R. J. I.; Kappen, F. H. J.; Boeriu, C. G., Chitosan films and blends for packaging material. *Carbohydrate Polymers* 2015, 116, 237-242.
9. Srikulkit, K.; Iamsamai, C.; Dubas, S. T., Development of Flame Retardant Polyphosphoric Acid Coating Based on the Polyelectrolyte Multilayers Technique. *Journal of Metals, Materials and Minerals* 2006, 16, 41-45.
10. Thakhiew, W.; Devahastin, S.; Soponronnarit, S., Effects of drying methods and plasticizer concentration on some physical and mechanical properties of edible chitosan films. *Journal of Food Engineering* 2010, 99, 216-224.
11. Ramya, R.; Venkatesan, J.; Kim, S. K.; Sudha, P. N., Biomedical Applications of Chitosan: An Overview. *Journal of Biomaterials and Tissue Engineering* 2012, 2, 100-111.
12. Anitha, A.; Sowmya, S.; Kumar, P. T. S.; Deepthi, S.; Chennazhi, K. P.; Ehrlich, H.; Tsurkan, M.; Jayakumar, R., Chitin and chitosan in selected biomedical applications. *Prog. Polym. Sci.* 2014, 39, 1644-1667.
13. Azuma, K.; Ifuku, S.; Osaki, T.; Okamoto, Y.; Minami, S., Preparation and Biomedical Applications of Chitin and Chitosan Nanofibers. *Journal of Biomedical Nanotechnology* 2014, 10, 2891-2920.
14. Cheung, R.; Ng, T.; Wong, J.; Chan, W., Chitosan: An Update on Potential Biomedical and Pharmaceutical Applications. *Marine Drugs* 2015, 13, 5156.
15. Rinaudo, M.; Pavlov, G.; Desbrièeres, J., Influence of acetic acid concentration on the solubilization of chitosan. *Polymer* 1999, 40, 7029-7032.
16. Lodhi, G.; Kim, Y.-S.; Hwang, J.-W.; Kim, S.-K.; Jeon, Y.-J.; Je, J.-Y.; Ahn, C.-B.; Moon, S.-H.; Jeon, B.-T.; Park, P.-J., Chitooligosaccharide and Its Derivatives: Preparation and Biological Applications. *BioMed Research International* 2014, 2014, 13.
17. Xing, R.; Liu, S.; Yu, H.; Guo, Z.; Wang, P.; Li, C.; Li, Z.; Li, P., Salt-assisted acid hydrolysis of chitosan to oligomers under microwave irradiation. *Carbohydrate Research* 2005, 340, 2150-2153.
18. Mao, S.; Shuai, X.; Unger, F.; Simon, M.; Bi, D.; Kissel, T., The depolymerization of chitosan: effects on physicochemical and biological properties. *International Journal of Pharmaceutics* 2004, 281, 45-54.
19. Tian, F.; Liu, Y.; Hu, K.; Zhao, B., Study of the depolymerization behavior of chitosan by hydrogen peroxide. *Carbohydrate Polymers* 2004, 57, 31-37.
20. Muzzarelli, R. A.; Stanic, V.; Ramos, V., Enzymatic Depolymerization of Chitins and Chitosans. 1999; Vol. 10, pp 197-211.
21. El-Tahlawy, K., Chitosan phosphate: A new way for production of eco-friendly flame-retardant cotton textiles. *The Journal of The Textile Institute* 2008, 99, 185-191.
22. Carosio, F.; Alongi, J.; Malucelli, G., Layer by Layer ammonium polyphosphate-based coatings for flame retardancy of polyester—cotton blends. *Carbohydrate Polymers* 2012, 88, 1460-1469.
23. Laufer, G.; Kirkland, C.; Cain, A. A.; Grunlan, J. C., Clay—Chitosan Nanobrick Walls: Completely Renewable Gas Barrier and Flame-Retardant Nanocoatings. *ACS Applied Materials & Interfaces* 2012, 4, 1643-1649.
24. Zhang, T.; Yan, H.; Shen, L.; Fang, Z.; Zhang, X.; Wang, J.; Zhang, B., Chitosan/Phytic Acid Polyelectrolyte Complex: A Green and Renewable Intumescent Flame Retardant System for Ethylene—Vinyl Acetate Copolymer. *Ind. Eng. Chem. Res.* 2014, 53, 19199-19207.
25. Charuchinda, S.; Srikulkit, K.; Mowattana, T., Co-application of Sodium Polyphosphate and Chitosan to Improve Flame Retardancy of Cotton Fabric. *Journal of Scientific Research, Chulalongkorn University* 2005, 30, 97-107.

What is claimed is:

1. A flame retardant composition prepared by dissolution of chitosan or a modified chitosan by an aqueous acid over a period of up to 30 days followed by evaporation of the water, wherein the aqueous acid is selected from the group consisting of hypophosphorous acid, aminophosphonic acid, phosphonoacetic acid, phenylphosphonic acid, phenylphosphinic acid, and combinations thereof.

2. The composition of 1, wherein the aqueous acid comprises hypophosphorous acid.

3. The composition of claim 1, wherein the aqueous acid is an aminophosphonic acid, and the aminophosphonic acid is aminomethylphosphonic acid.

4. The composition of claim 1 further comprising at least one additional component added prior to water evaporation and selected from the group consisting of a polyol, a flame retardant, a nitrogen containing compound, a carbonate containing compound, a crosslinking agent, and combinations thereof.

5. The composition of claim 4, wherein the at least one added component comprises a polyol selected from the group consisting of glycerol, sorbitol, xylitol, sucralose, hydroxyethylcellulose, hydroxypropylcellulose, and combinations thereof.

6. The composition of claim 4, wherein the at least one added component comprises a flame retardant selected from the group consisting of laponite, talc, magnesium hydroxide, aluminum hydroxide, zinc acetate, zinc stannate, zinc hydroxystannate, zinc borate, and combinations thereof.

7. The composition of claim 4, wherein the at least one added component comprises a nitrogen containing compound selected from the group consisting of melamine, guanidine, 3-aminopropylimidazole, urea, glycine, poly(diallyldimethylammonium chloride), polyethyleneimine, and combinations thereof.

8. The composition of claim 4, wherein the at least one added component comprises a carbonate containing compound that is calcium carbonate or calcium gluconate.

9. The composition of claim 4, wherein the at least one added component comprises a crosslinking agent selected from the group consisting of a phosphate containing compound, dicarboxylic acid, dialdehyde, diglycidyl compound, polyhalogenated compound, epichlorohydrin, epibromohydrin, a vinyl containing compound, and combinations thereof.

10. The composition of claim 9, wherein the at least one added component comprises a phosphate containing compound selected from the group consisting of sodium phosphate, sodium metaphosphate, phytic acid, nitrilotri(methylphosphonic acid), iminodi(methylphosphonic acid), diethylenetriaminepentakis(methylphosphonic) acid, N,N-bis(phosphonomethyl)glycine, etidronic acid, N-(phosphonomethyl)iminodiacetic acid, 2-[[amino(imino)methyl](methyl)amino]ethyl dihydrogen phosphate, and combinations thereof.

11. The composition of claim 9, wherein the at least one added component comprises a dicarboxylic acid that is tartaric acid.

12. The composition of claim 1, wherein the chitosan or modified chitosan has an average molecular weight of between 10 kDa and 900 kDa.

13. The composition of claim 1, wherein the chitosan or modified chitosan has a mean particle size of between 70 nm and 300 nm.

14. A flame retardant composition prepared by dissolution of chitosan or a modified chitosan by an aqueous acid over a period of up to 30 days followed by evaporation of the water, wherein:

the aqueous acid is selected from the group consisting of hypophosphorous acid, aminophosphonic acid, aminosulfonic acid, phosphonoacetic acid, phenylphosphonic acid, phenylphosphinic acid, p-toluenesulfonic acid, trifluoromethylsulfonic acid, sulfaninilic acid, and combinations thereof; and at least one additional component is added prior to water evaporation and selected from the group consisting of a polyol, a flame retardant, a nitrogen containing compound, a carbonate containing compound, a crosslinking agent, and combinations thereof, and at least one added component comprises a polyhalogenated compound that is cyanuric chloride or 2,4-dichloro-6-alkyltriazine.

15. The composition of claim 14, wherein the at least one added component comprises a 2,4-dichloro-6-alkyltriazine selected from the group consisting of 2,4-dichloro-6-methoxy-1,3,5-triazine, 2,4-dichloro-6-N-propoxy-1,3,5-triazine, 2,4-dichloro-6-morpholino-1,3,5-triazine, 2,4-dichloro-6-methyl-1,3,5-triazine, 2,4-dichloro-6-phenyl-1,3,5-triazine, 2-(4-biphenylyl)-4,6-dichloro-1,3,5-triazine, 2-(3-carboxyanilino)-4,6-dichloro-1,3,5-triazine, or 2-amino-4,6-dichloro-1,3,5-triazine.

16. The composition of claim 1, wherein the dissolution of chitosan or modified chitosan is of a chistesan chitosan modified by grafting alkyl or aryl groups to chitin and deacetylating the grafted chitin with sodium hydroxide.

17. The composition of claim 9, wherein the crosslinking agent is covalently grafted to the chitosan or modified chitosan.

* * * * *